Oct. 3, 1961 O. BIHLMAIER 3,002,436
PHOTOGRAPHIC CAMERA
Filed Dec. 14, 1959 3 Sheets-Sheet 3
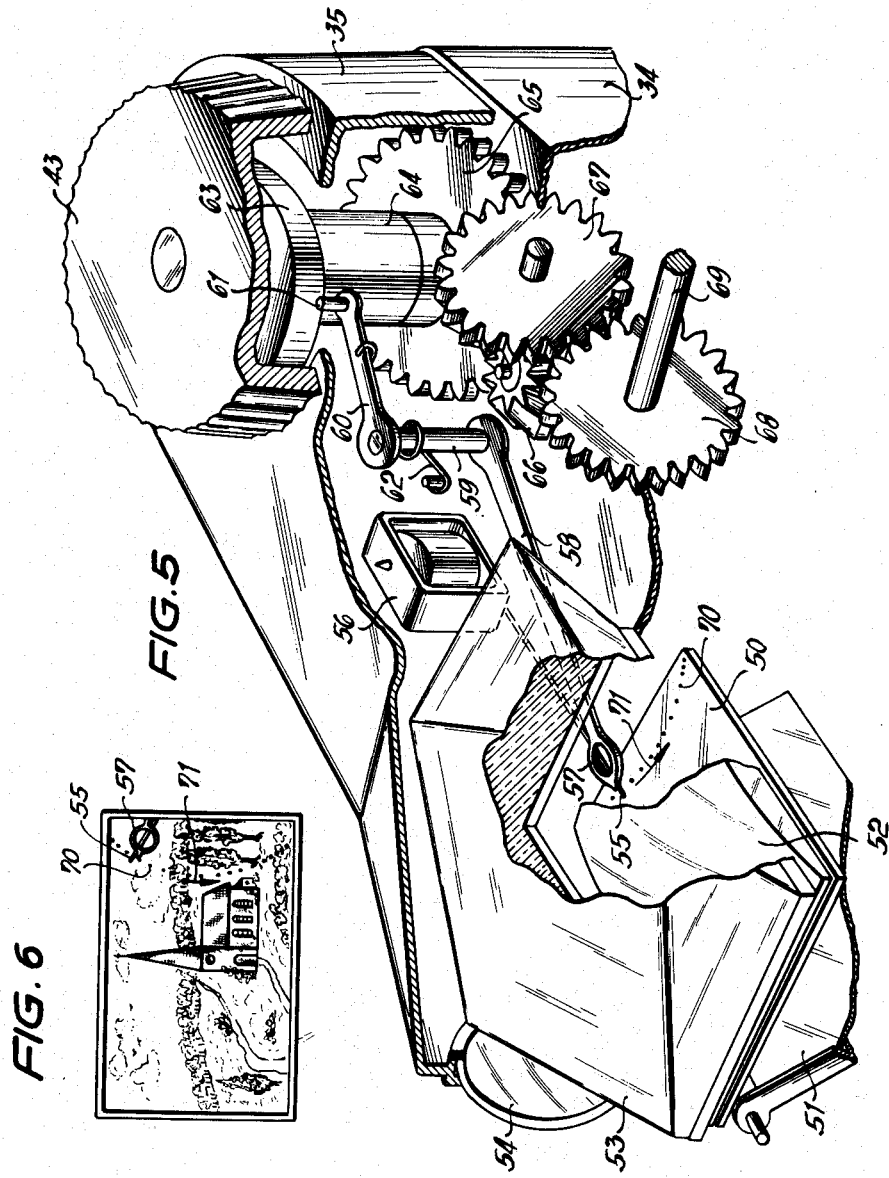
INVENTOR
OSKAR BIHLMAIER

United States Patent Office 3,002,436
Patented Oct. 3, 1961

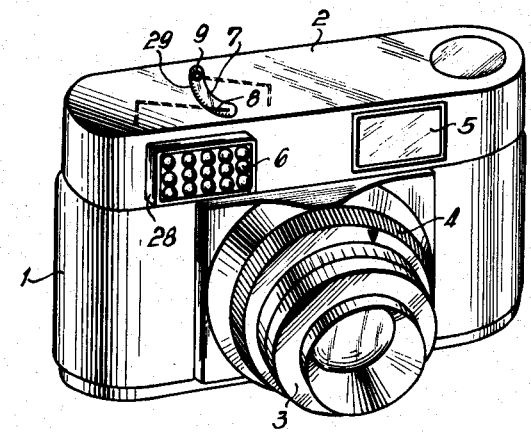
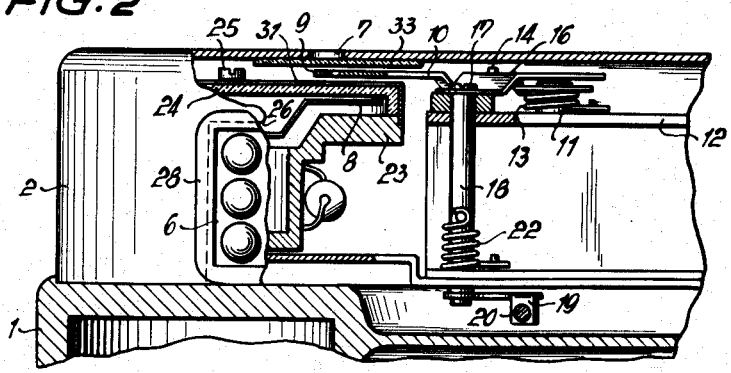
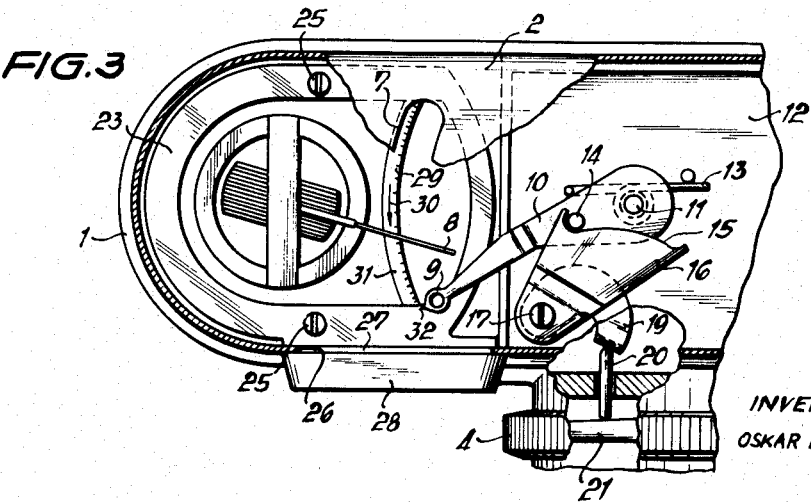
INVENTOR
OSKAR BIHLMAIER

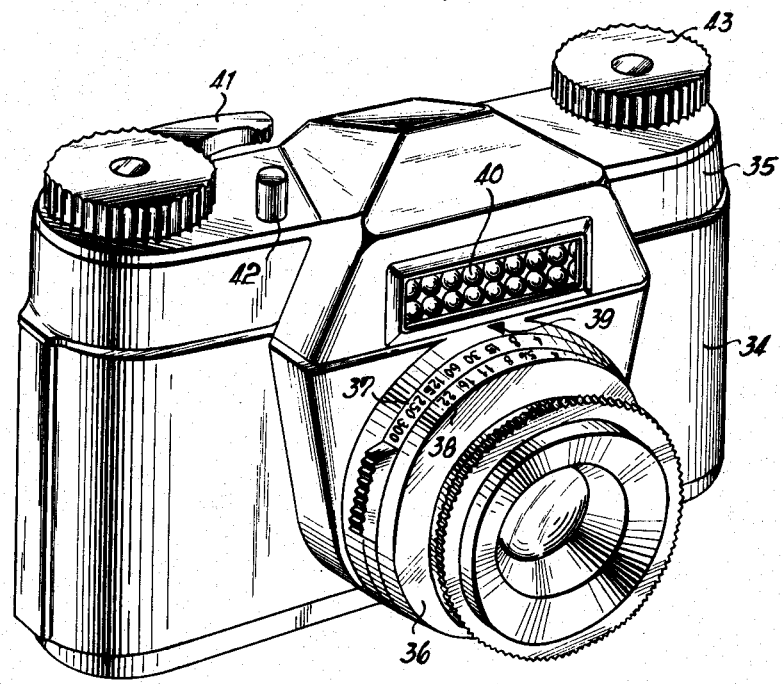

3,002,436
PHOTOGRAPHIC CAMERA
Oskar Bihlmaier, Braunschweig-Gliesmarode, Germany, assignor to Voigtlander A.G., Braunschweig, Germany, a corporation of Germany
Filed Dec. 14, 1959, Ser. No. 859,459
Claims priority, application Germany Dec. 13, 1958
7 Claims. (Cl. 95—10)

This invention relates to photographic cameras and it has particular relation to correspond to photographic cameras provided with a built-in electric exposure meter and an indicator or mark arranged to be brought into coincidence with the pointer of the exposure meter and coupled with the exposure adjusting means. In cameras of this type, upon adjustment of the follow-up mark to the deflection of the exposure meter pointer, a combination of exposure time and diaphragm is adjusted at the same time, and which corresponds to the available light conditions and is in conformity with the exposure value.

In order to take into consideration additional exposure factors, e.g. filter factors, in connection with such adjustments, it has been suggested previously to arrange, opposite the adjusting handle for the follow-up mark, a scale calibrated in conformity with the additional exposure factors. After adjustment of the follow-up mark to the pointer deflection, by further adjustment of the adjusting handle relative to the scale, an adjustment corresponding to the beforementioned additional exposure value factor can be brought about.

It has also been known from the art to compensate for the additional exposure factors by providing an adjustment in the transmission means connecting the adjusting handle and the follow-up mark, whereby a changeable position relative to the exposure value adjuster is imparted to the follow-up mark. However, it may happen, in such devices, that an adjustment of the transmission means for consideration of a certain filter factor, is inadvertently not cancelled subsequently, so that, in all photographic pictures taken subsequently without filter, over-exposure will occur.

The main object of the present invention is to avoid this undesirable condition. A further object is to provide a device in which adjustment of the exposure value adjuster, with consideration of additional exposure factors, can be effected particularly easily.

According to the present invention, in cameras of the above-mentioned type it is contemplated to coordinate to the follow-up mark a scale of additional exposure factors, preferably filter factors. The particular advantage of this arrangement consists in that, in observing the elements which are determinative for the adjustment of exposure value, i.e. the exposure meter pointer and the follow-up mark, at the same time the adjustment for consideration of additional exposure factors can be also effected.

The above mentioned scale contains marks of any suitable design, and an arrow indicating the direction of displacement in which the follow-up mark has to be moved for consideration of additional exposure factors. This scale and the arrow can not only be arranged on a particular carrier member, but also directly on parts of the camera or of the exposure meter.

The arrangement according to the present invention is particularly advantageous in cameras in which the exposure meter pointer and the follow-up mark and, if desired, also the scales for exposure time, diaphragm opening, distance and depth of field range, can be seen while looking through the finder, because it is then possible to carry out all adjustments essential for a photographic exposure while looking into the finder.

The appended drawings illustrate, by way of example, two specific embodiments of and best modes for carrying out the invention, to which the invention is not limited.

In the drawings:
FIG. 1 is a perspective view of a photographic camera provided with a built-in electric exposure meter and a follow-up indicator coupled with the exposure value adjusting means for the shutter;
FIG. 2 is a front elevational view, partly broken away and partly in section, of the camera cap, a portion of the camera body being shown in section;
FIG. 3 is a partial top plan view, partly broken away and partly in section, of the camera shown in FIG. 1;
FIG. 4 is a perspective view of another camera embodying the present invention;
FIG. 5 is a greatly enlarged perspective view, partly broken away and partly in section, of a portion of the top of the camera shown in FIG. 4; and
FIG. 6 is a diagrammatic illustration of the view appearing to an operator looking through the viewfinder of the camera.

Referring now to the drawings in detail, the photographic camera shown in FIG. 1 has a cap 2 and a structural unit 3, which consists of the objective mount and the central shutter. Rotatably arranged on unit 3 is a ring 4 for adjustment of the exposure value, ring 4 being coupled with the respective adjusting means for shutter time and diaphragm opening. The camera cap 2 has on its front side cutouts for a finder window 5 and a light sensitive cell 6 of an exposure meter, and has on its upper side an arcuate window 7, through which can be seen, as only diagrammatically indicated in FIG. 1, the pointer 8 of the exposure meter and a follow-up mark 9, which latter can be displaced by operation of exposure value adjusting ring 4.

As shown in FIGS. 2 and 3, the follow-up mark 9 is the free end of a lever arm 10, which is swingable about a pivot 11 seated in a partition 12. Lever arm 10 is biased by a spring 13 wound around pivot 11 in such a manner that a pin 14 seated in the lever arm is maintained constantly in engagement with the control edge 15 of a control lever 16. The control lever 16 is fastened by an adjusting screw 17 to a shaft 18 which extends through partition 12 and carries on its other end a control arm 19. One end of a control pin 20, which is displaceably arranged in the objective mount, engages control arm 19. The other end of control pin 20 engages a control cam 21 which is connected with the exposure value adjusting ring 4. A spring 22 biases shaft 18 in a direction such that, through control arm 19, control pin 20 is constantly maintained in engagement with control cam 21.

Upon turning exposure value adjusting ring 4, control pin 20 is displaced. Thereby it pivots control arm 19, control lever 16 and, through pin 14, lever arm 10 with its follow-up mark 9.

The exposure meter and all parts necessary for its operation are housed in a casing 23, which carries also the light-sensitive cell 6. A transparent disk 24 arranged above the measuring device forms a dust-proof seal for the casing and pointer 8 can be seen through this disk. The path of movement of follow-up mark 9 extends above disk 24. Casing 23 is fastened to the camera body by means of screws 25 in such manner that the paths of movement of pointer 8 and of follow-up mark 9 intersect each other in the range of window 7.

Mount 28 carrying the cell 6 is formed, on its upper longitudinal edge and on both narrow edges, with a slot 27, which is entered and sealed by the edges of an opening 26 in the camera cap 2.

The parts are tuned to each other in such manner that, upon causing superposition of follow-up mark 9 and pointer 8 by turning exposure adjusting ring 4, a combination of exposure time with the diaphragm opening is provided which corresponds to the pointer deflection, i.e. to the available light conditions in the respective case.

If in a photographic exposure a filter is inserted in front of the picture-taking objective, the weakening of the light caused by the filter must be compensated for by a corresponding extension of the exposure time and a correspondingly increased diaphragm opening, respectively. This requires displacement of the exposure value adjusting ring 4, which results in a coresponding movement of the follow-up mark 9 relative to the pointer 8.

According to the present invention, a scale 29, which cooperates with the follow-up mark 9, is provided for. The graduation of this scale is selected in accordance with the displacement of follow-up mark 9, resulting also in displacement of ring 4, which is required to take into consideration a filter factor. This scale 29 and the arrow 30 are arranged, by way of example, on a particular carrier 31 which is fastened to disk 24. The follow-up mark 9 has a point 32, which points to said scale 29. Of course, scale 29 and arrow 30 can be arranged also at another place, e.g. on the inner or outer surface of camera cap 2 or on the transparent covering 33 for the window 7. They do not have to be arranged on a particular carrier and can be directly applied to disk 24, or cap 2, or covering 33.

The scale 29, arrow 30 and the follow-up mark 9 make it possible to take filter factors into consideration, during the adjustment of exposure values, in a particularly favorable manner. If in connection with taking a photographic picture with a filter inserted in front of the picture-taking objective, after adjustment of follow-up mark 9 to pointer 8, the follow-up mark 9 is further moved in the direction of arrow 30 by a number of graduations of scale 29, which number corresponds to the filter factor, by the corresponding further displacement of exposure value adjusting ring 4, a change of the exposure value adjustment, which corresponds to the filter factor, has also been effected. This additional adjustment is automatically cancelled in a subsequent new adjustment of follow-up mark 9 to pointer 8, because this new adjustment of mark 9 and pointer 8 is adapted, as already mentioned above, to an exposure value corresponding to the prevailing light conditions only.

In the example illustrated in FIGS. 4, 5 and 6, a device according to the present invention is illustrated as incorporated in a one-lens reflex camera.

In FIGS. 4, 5 and 6, the body 34 of such a camera is covered on its upper narrow side by a camera cap 35. Objective mount body 36 forms a structural unit with an objective shutter, and including adjusting rings 37 and 38 for exposure time and diaphragm opening, respectively. The scales for exposure time and diaphragm opening provided on the adjusting rings cooperate with a common stationary mark 39. Photocell 40, of an electric exposure meter built-in in camera cap 35, is arranged above the objective mount body 36. A film feed lever is shown in FIG. 4 at 41 and a shutter release key at 42. Arranged at the other end of the camera cap 35 is adjusting button 43 of the adjusting device described hereinafter for adjusting the exposure value based on the indication of the exposure meter.

FIGURE 5 illustrates (on an enlarged scale in comparison with FIG. 4) only that part of the camera cap 35 which contains this adjusting device. Additionally, FIG. 5 shows mirror 51, which is swung into the path of light rays entering through the objective and reflects these rays to a field lens 52 seated in camera body 34 and to a Fresnel lens 50, which forms an image of the object. Arranged above the field lens 52 is a prism 53 and an ocular 54, through which the image formed by field lens 52 and Fresnel lens 50 can be seen in upright and laterally correct position. Projecting into the space between field lens 52 and prism 53 are pointer 55 of the measuring instrument 56, connected with photocell 40 (FIG. 4) and a follow-up mark 57, which is the free end of a lever 58. Thereby, the operator looking into ocular 54 will see also, at the border of the finder image, pointer 55 and follow-up mark 57, as shown in FIG. 6.

It will be also understood from FIG. 5 that one-armed lever 58, which carries follow-up mark 57, is mounted on a pivot 59, which is rotatably journalled in camera body 34. Also seated on pivot or shaft 59 is a contact or scanning lever 60 provided with a contact or scanning pin 61. By means of a spring 62 biasing lever 60, pin 61 is kept constantly engaged with a cam disk 63, which is fixedly seated on shaft 64 connected with adjusting button 43. A gear 65 is secured to shaft 64 and drives a gear 68 on a shaft 69 through a gear train including gears 66 and 67. In a known manner, shaft 69 comprises the exposure value adjusting means for the shutter. Shaft 69 is so coupled with rings 37 and 38 that these rings are adjusted in correspondence with the movement of shaft 69.

Thus, when adjusting button 43 is turned, follow-up mark 57 is moved by cam disk 63 and the exposure value is adjusted by means of the gear train 65 through 68 and shaft 69. The parts are so correlated that, when follow-up mark 57 has been brought into coincidence with pointer 55, an exposure time and diaphragm opening adjustment has been effected and which corresponds to the prevailing light conditions.

In order to take into consideration filter factors, a scale 70, which is associated with follow-up mark 57 and lies in the focal field of ocular 54, and an arrow 71 are provided. This scale 70 and arrow 71 are located on the Fresnel lens 50, which is arranged betwen field lens 52 and mirror 51. However, the scale and arrow can be also applied either to the field lens 52, or to that surface of prism 53 which faces field lens 52, and they also can be arranged on a particular carrier which is arranged on, or near, the prism 53, or field lens 52, or the Fresnel lens 50.

Upon looking into ocular 54 the image shown in FIG. 6 can be seen. Specifically the exposure meter pointer 55, the follow-up mark 57 and the associated scale 70 and the arrow 71 can be seen within the image field of the finder.

Thus, during looking into the finder, by turning button 43 the follow-up mark 57 can be adjusted to the pointer 55 so that an exposure value adjustment which corresponds to the prevailing light conditions, can be brought about. If a filter is used for the contemplated exposure, then follow-up mark 57, after being brought to superposition with pointer 55, is moved further in the direction of arrow 71 to an extent corresponding to a number of divisions of scale 70 which correspond to the filter factor in the respective case, so that an exposure value adjustment is obtained which corresponds to the prevailing light conditions and to the additional adjustment necessitated by the filter.

The marks of the scales 70 and 29 can be black or colored dots or dashes.

It will be understood from the above that this invention is not limited to the specific details described above and illustrated in the drawings and can be carried out with various modifications without departing from the scope of the invention as defined in the appended claims.

What is claimed is:

1. In a photographic camera including a built-in exposure meter having a movable pointer, an objective lens system, exposure condition adjusting means operatively associated with said lens system, a follow-up indicator movable into coincidence with said pointer, and means coupling said indicator and said adjustment means in such a manner that the adjusted exposure conditions correspond to the position of said indicator: improved means for setting the exposure conditions to compensate for the use of a filter with said lens system, comprising a scale along which said indicator is movable; said scale being graduated in accordance with filter values, with a selected number of graduations thereof corresponding to a selected filter value; whereby, when said indicator has been moved into coincidence with said pointer, a further movement of said indicator over a number of graduations of said scale corresponding to the value of a filter used with the lens system will result in setting of the exposure conditions to compensate for the presence of such filter.

2. In a photographic camera as claimed in claim 1: an exposure condition adjusting member on said lens system and connected to said exposure condition adjusting means; whereby movement of said indicator is effected by operation of said exposure condition adjusting member.

3. In a photographic camera as claimed in claim 1: an operating knob on said camera coupled to said indicator; said coupling means connecting said operating knob to said exposure condition adjusting means; whereby, upon operation of said knob said indicator and said exposure condition adjusting means are concurrently adjusted.

4. In a photographic camera as claimed in claim 1: means having a plane surface carrying said scale, the plane surface being parallel to the plane of movement of said indicator; and an arrow on said plane surface extending along said scale and indicating the direction of movement of said indicator for compensating for the filter.

5. In a photographic camera as claimed in claim 1: said scale, said pointer, and said indicator being observable through a window of the camera.

6. In a photographic camera as claimed in claim 1: said camera comprising a mirror reflex camera including a viewfinder incorporating a lens and a viewing prism; said scale being carried by a surface of said lens; said pointer and said indicator moving between said lens and said viewing prism; whereby said scale, said pointer, and said indicator are in the field of view of an observer looking through the viewfinder of the camera.

7. In a photographic camera as claimed in claim 1: a tip projecting from said indicator and operatively associated with said scale.

References Cited in the file of this patent

UNITED STATES PATENTS

| | | |
|---|---|---|
| 2,242,043 | Sanger | May 13, 1941 |
| 2,887,026 | Rentschler | May 19, 1959 |
| 2,902,968 | Barthruff | Sept. 8, 1959 |
| 2,926,571 | Sommer | Mar. 1, 1960 |
| 2,928,323 | Steisslinger | Mar. 15, 1960 |
| 2,932,242 | Greger | Apr. 12, 1960 |
| 2,933,991 | Sauer | Apr. 26, 1960 |